US011242766B2

(12) United States Patent
Boudsocq

(10) Patent No.: US 11,242,766 B2
(45) Date of Patent: Feb. 8, 2022

(54) METHOD AND DEVICE FOR MEASURING THE FLOW RATE OF COOLING AIR IN A TURBOMACHINE CASING

(71) Applicant: SAFRAN AIRCRAFT ENGINES, Paris (FR)

(72) Inventor: Benjamin Boudsocq, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 113 days.

(21) Appl. No.: 16/768,221

(22) PCT Filed: Nov. 28, 2018

(86) PCT No.: PCT/FR2018/053017
§ 371 (c)(1),
(2) Date: May 29, 2020

(87) PCT Pub. No.: WO2019/106286
PCT Pub. Date: Jun. 6, 2019

(65) Prior Publication Data
US 2020/0291807 A1    Sep. 17, 2020

(30) Foreign Application Priority Data
Nov. 30, 2017 (FR) ...................................... 1761474

(51) Int. Cl.
*F01D 25/12* (2006.01)
*F01D 11/24* (2006.01)
*F01D 17/08* (2006.01)

(52) U.S. Cl.
CPC .............. *F01D 11/24* (2013.01); *F01D 25/12* (2013.01); *F01D 17/08* (2013.01);
(Continued)

(58) Field of Classification Search
CPC .......... F01D 25/12; F01D 11/24; F01D 17/06; F01D 17/08; G01F 1/34; G01F 1/68;
(Continued)

(56) References Cited

U.S. PATENT DOCUMENTS 3,167,954 A * 2/1965 Hutton ...................... F02C 7/32
                                                         73/168
4,003,249 A * 1/1977 Laskody ................. G01L 5/133
                                                        73/112.04
(Continued)

FOREIGN PATENT DOCUMENTS

FR     2 998 050 A1    5/2014
FR     2 999 226 A1    6/2014

OTHER PUBLICATIONS

International Search Repot for PCT/FR2018/053017 dated Apr. 5, 2019 (PCT/ISA/210).

*Primary Examiner* — Igor Kershteyn
(74) *Attorney, Agent, or Firm* — Sughrue Mion, PLLC

(57) ABSTRACT

The invention relates to a method for measuring the flow rate of cooling air in a cooling air circuit (13) of a casing (121) of a high-pressure turbine (9) of a turbomachine (1). The invention is characterized in that sensors (21, 22, 24, 26, 28) are used to measure a total pressure at the fan inlet, a static pressure at the outlet of the high-pressure compressor (6), a rotational speed of the low-pressure shaft (101), a rotational speed of the high-pressure shaft (91) and a degree of valve opening of the cooling air circuit (13), a calculation unit is used to calculate the flow rate of cooling air on the basis of at least the measurement of these.

16 Claims, 2 Drawing Sheets

Figure 1:
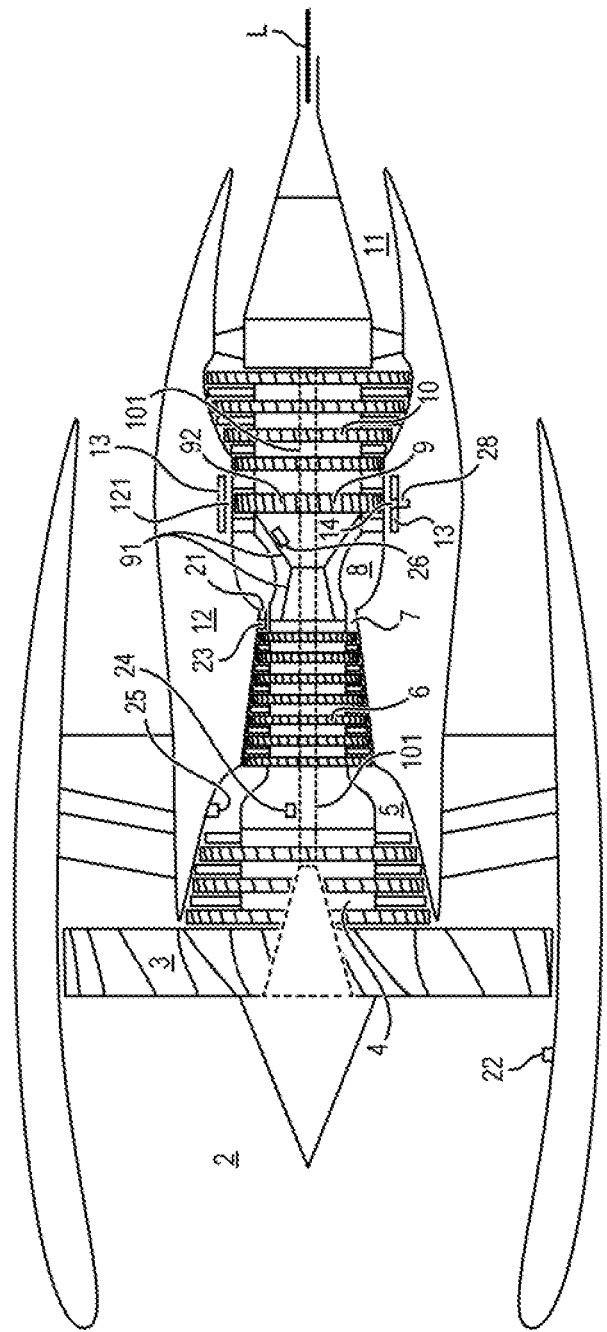

(52) U.S. Cl.
CPC .... *F05D 2220/323* (2013.01); *F05D 2260/80* (2013.01); *F05D 2260/83* (2013.01); *F05D 2270/301* (2013.01); *F05D 2270/303* (2013.01); *F05D 2270/304* (2013.01)

(58) Field of Classification Search
CPC ........... F05D 2220/323; F05D 2260/80; F05D 2260/83; F05D 2270/71; F05D 2270/301; F05D 2270/304; F05D 2270/3062
See application file for complete search history.

(56) References Cited

U.S. PATENT DOCUMENTS

| | | | | |
|---|---|---|---|---|
| 5,005,353 | A * | 4/1991 | Acton | F01D 17/02 60/39.281 |
| 2014/0271119 | A1* | 9/2014 | Lebel | G01F 1/88 415/1 |
| 2017/0298755 | A1* | 10/2017 | Mizukami | F04D 29/5806 |
| 2019/0376408 | A1* | 12/2019 | Adibhatla | F01D 17/04 |
| 2020/0300111 | A1* | 9/2020 | Hussain | F01D 21/003 |

* cited by examiner

METHOD AND DEVICE FOR MEASURING THE FLOW RATE OF COOLING AIR IN A TURBOMACHINE CASING

CROSS REFERENCE TO RELATED APPLICATIONS

This application is a National Stage of International Application No. PCT/FR2018/053017 filed Nov. 28, 2018, claiming priority based on French Patent Application No. 1761474, filed Nov. 30, 2017, the entire contents of each of which are herein incorporated by reference in their entireties.

The invention relates to a method for measuring the flow rate of cooling air in a cooling circuit of a casing of a high-pressure turbine of a turbomachine.

A field of application of the invention is particularly aircraft turbo-jets or turbo-propellers.

This cooling circuit (High Pressure Turbine Active Clearance Control) operates on the cooling of the casing at the blade tips of the high-pressure turbine. The aforementioned flow rate is known as the HPTACC flow rate. The control of the clearance between these blades and the casing has a very heavy impact on the temperature margins in the turbines. The aim is therefore to have as low a clearance as possible to have the best performance while avoiding contact between the casing and the blades, which in this case would then wear and degrade the high-pressure turbine irreversibly.

The knowledge and accuracy of the HPTACC flow rate has an impact of the highest order on the control of the clearance at the blade tips of the high-pressure turbine. It is therefore very important to control and know the flow rate of air that is passing in the cooling circuit.

Usually, to know the flow rate, a bulk temperature of the casing at the blade tips or dedicated air temperatures and various theoretical models implemented in the calculator (model of pressure at the inlet of the cooling circuit, model of temperature at the inlet of the cooling circuit, model of permeability of the cooling circuit, model of pressure at the outlet of the cooling circuit) are used. Each of these models has the drawback of contributing its own inaccuracies. These inaccuracies accumulate and give rise to a high degree of uncertainty on the flow rate of cooling air, which prevents the optimization of the cooling circuit.

The aim of the invention is to obtain a method and a device for measuring the flow rate of cooling air and a turbomachine equipped with these, which avoid the drawbacks of the prior art and make it possible to obtain better accuracy on this flow rate, with a lower cost and better reliability.

For this purpose, a first subject matter of the invention is a method for measuring the flow rate of cooling air in a cooling air circuit of a casing of a high-pressure turbine of a turbomachine,
characterized in that
measurements are made
by a first sensor of pressure, disposed at the inlet of a fan of the turbomachine, of a total pressure at the fan inlet,
and/or by a second sensor of pressure, disposed at the outlet of a high-pressure compressor of the turbomachine, of a static pressure at the outlet of the high-pressure compressor,
and/or by a third sensor of temperature, disposed between a low-pressure compressor of the turbomachine and the high-pressure compressor, of a temperature between compressors,
and/or by a fourth sensor of temperature, disposed at the outlet of the high-pressure compressor, of an outlet temperature of the high-pressure compressor,
and/or by a fifth sensor of the rotational speed of a low-pressure shaft, of the rotational speed of the low-pressure shaft,
and/or by a sixth sensor of the rotational speed of a high-pressure shaft, of the rotational speed of the high-pressure shaft,
and/or by a seventh sensor of the degree of opening of at least one valve of the cooling air circuit, of the degree of valve opening of the cooling air circuit,
the flow rate of cooling air is calculated in a computing unit as a function of the total pressure at the fan inlet and/or of the static pressure at the outlet of the high-pressure compressor, and/or of the temperature between compressors, and/or of the outlet temperature of the high-pressure compressor, and/or of the rotational speed of the low-pressure shaft, and/or of the rotational speed of the high-pressure shaft, and/or of the degree of valve opening of the cooling air circuit.

Owing to the invention, one or more of the aforementioned sensors, which are usually present for engine control, are used for determining the flow rate of cooling air. Thus, the invention makes it possible to determine the flow rate of cooling air without adding any specific sensors.

According to an embodiment of the invention, the first, second, third, fourth, fifth and sixth sensors are engine control sensors.

According to an embodiment of the invention, the first, second, third, fourth, fifth and sixth sensors are external to the cooling air circuit of the casing of the high-pressure turbine of the turbomachine.

According to an embodiment of the invention, values of reduced flow rate are previously stored in a database in association with values of a ratio of the rotational speed of the high-pressure shaft to the rotational speed of the low-pressure shaft and in association with values of the degree of valve opening of the cooling air circuit,
a reduced flow rate is computed, based on values of the database and as a function of the computed ratio of the rotational speed of the high-pressure shaft, which has been measured, to the rotational speed of the low-pressure shaft, which has been measured, and as a function of the degree of valve opening of the cooling air circuit, which has been measured,
the flow rate of cooling air being computed proportionately to the reduced flow rate, which has been computed.

According to an embodiment of the invention, the flow rate of cooling air is computed as a function of the difference between the outlet temperature of the high-pressure compressor and the temperature between compressors.

According to an embodiment of the invention, the flow rate of cooling air is computed as a function of the square root of the difference between the outlet temperature of the high-pressure compressor and the temperature between compressors.

According to an embodiment of the invention, the flow rate of cooling air is computed proportionately to the inverse of the square root of the difference between the outlet temperature of the high-pressure compressor and the temperature between compressors.

According to an embodiment of the invention, the flow rate of cooling air is computed proportionately to the difference between the static pressure at the outlet of the high-pressure compressor and the total pressure at the fan inlet.

According to an embodiment of the invention, the flow rate of cooling air is computed proportionately to the ratio of the total pressure at the fan inlet to the static pressure at the outlet of the high-pressure compressor.

According to an embodiment of the invention, the flow rate $W_{HPTACC}$ of cooling air is computed according to the following equation:

$$W_{HPTACC} = W_{red}\left(\frac{XN25}{XN12}\right) * \frac{PT2}{Ps3} * (Ps3 - PT2) * \frac{1}{\sqrt{T3 - T25}}$$

where $W_{red}$ is the reduced flow rate,

PT2 is the total pressure at the fan inlet,

Ps3 is the static pressure at the outlet of the high-pressure compressor,

T25 is the temperature between compressors,

T3 is the outlet temperature of the high-pressure compressor,

XN12 is the rotational speed of the low-pressure shaft,

XN25 is the rotational speed of the high-pressure shaft.

A second subject matter of the invention is a measuring device, intended to measure a flow rate of cooling air in a cooling air circuit of a casing of a high-pressure turbine of a turbomachine, characterized in that it comprises a first sensor of pressure, intended to be disposed at the inlet of a fan of the turbomachine, for measuring a total pressure at the fan inlet, and/or a second sensor of pressure, intended to be disposed at the outlet of a high-pressure compressor of the turbomachine, for measuring a static pressure at the outlet of the high-pressure compressor, and/or a third sensor of temperature, intended to be disposed between a low-pressure compressor of the turbomachine and the high-pressure compressor, for measuring a temperature between compressors, and/or a fourth sensor of temperature, intended to be disposed at the outlet of the high-pressure compressor, for measuring an outlet temperature of the high-pressure compressor, and/or a fifth sensor of rotational speed of a low-pressure shaft, and/or a sixth sensor of rotational speed of a high-pressure shaft, and/or a seventh sensor of the degree of opening of at least one valve of the cooling air circuit, a unit for computing the flow rate of cooling air in the cooling air circuit of the casing of the high-pressure turbine as a function of the total pressure at the fan inlet, and/or of the static pressure at the outlet of the high-pressure compressor, and/or of the temperature between compressors, and/or of the outlet temperature of the high-pressure compressor, and/or of the rotational speed of the low-pressure shaft, and/or of the rotational speed of the high-pressure shaft, and/or of the degree of valve opening of the cooling air circuit.

A third subject matter of the invention is a computer program, comprising code instructions for implementing the method for measuring the flow rate of cooling air in a cooling air circuit of a casing of a high-pressure turbine of a turbomachine, as described above, when it is executed on a calculator.

Figure 2:
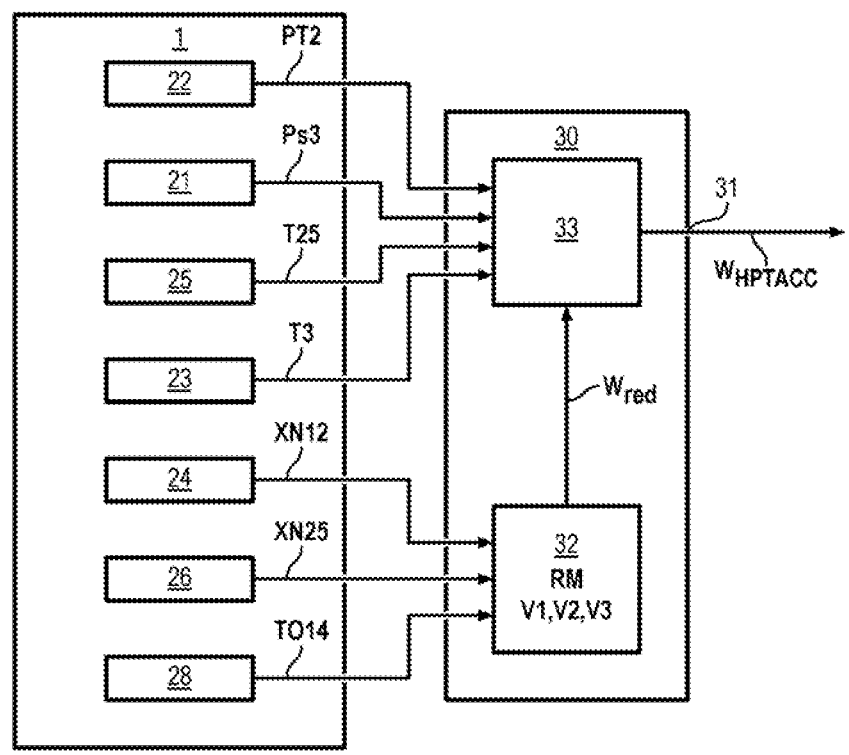

The invention will be better understood on reading the following description, given solely by way of non-limiting example with reference to the appended drawings, wherein:

FIG. 1 schematically represents a turbomachine on which is implemented the computing of the flow rate of cooling air according to the invention, FIG. 2 is a modular block diagram of a device for measuring the flow rate of cooling air according to an embodiment of the invention.

The measuring method and the measuring device implementing this measuring method according to embodiments of the invention are described below with reference to FIGS. 1 and 2.

In FIG. 1, a turbomachine 1, such as for example a turbo jet of an aircraft or a turbo-propeller, comprises successively, from upstream to downstream in the direction of passage of the fluid:

a fan air intake inlet 2, a fan 3 for sucking in air from upstream to downstream, a low-pressure compressor 4, a compartment 5 between the low-pressure compressor 4 and a high-pressure compressor 6, the high-pressure compressor 6, an outlet 7 of the high-pressure compressor 6, a combustion chamber 8, a high-pressure turbine 9, a low-pressure turbine 10, a fluid exhaust nozzle 11.

The high-pressure turbine 9 is mechanically connected to a high-pressure shaft 91 to turn the high-pressure compressor 6 about its first axis of rotation. The low-pressure turbine 10 is mechanically connected to a low-pressure shaft 101 to turn the low-pressure compressor 4 about its second axis of rotation. The first axis of rotation and the second axis of rotation are central and coaxial along the longitudinal direction of the turbomachine, oriented from upstream to downstream.

The high-pressure turbine 9 comprises first blades 92 attached to the high-pressure shaft 91 and able to turn about the first axis of rotation.

The turbomachine 1 comprises a casing 12 comprising a casing part 121 located around the blades 92 of the high-pressure turbine 9, this casing part 121 being known as the high-pressure turbine casing 121.

The turbomachine 1 comprises a cooling air circuit 13 for cooling the high-pressure turbine casing 121. There is a clearance between the blades 92 of the high-pressure turbine 9 and the high-pressure turbine casing 121. The cooling air circuit 13 is part of a system of active control of the clearance of the high-pressure turbine 9, known by the acronym HPTACC (High Pressure Turbine Active Clearance Control). The cooling air circuit 13 is also denoted by the term HPTACC circuit. The cooling air circuit 13 takes in cooling air from the high-pressure compressor 6. The cooling air circuit 13 comprises one or more ducts or tubes for sending the cooling air onto the external surface of the high-pressure turbine casing 121, the internal surface of the high-pressure turbine casing 121 being oriented toward the blades 92. The cooling air circuit 13 comprises one or more valves 14 for modifying the flow rate of cooling air in the duct or ducts of the circuit 13.

The turbomachine 1 further comprises:

a first sensor 22 of pressure, disposed at the inlet 2 of the fan 3, for measuring a total pressure PT2 at the fan inlet, a second sensor 21 of pressure, disposed at the outlet 7 of the high-pressure compressor 6, for measuring a static pressure Ps3 at the outlet of the high-pressure compressor 6, a third sensor 25 of temperature, disposed in the compartment 5 between the low-pressure compressor 4 and the high-pressure compressor 6, for measuring a temperature T25 between compressors, a fourth sensor 23 of temperature, disposed at the outlet 7 of the high-pressure compressor 6, for measuring an outlet temperature T3 of the high-pressure compressor 6, a fifth sensor 24 of rotational speed XN12 of the low-pressure shaft 101, a sixth sensor 26 of rotational speed XN25 of the high-pressure shaft 91, a seventh sensor 28 of the degree of opening TO14 of the valve 14 of the cooling air circuit 13.

Of course, provision can be made for only one or for several of the sensors 21, 22, 23, 24, 25, 26, 28.

According to the invention, the flow rate $W_{HPTACC}$ of cooling air of the cooling air circuit 13 of the casing 121 of the high-pressure turbine 9 is reconstituted from one, several or all of these sensors 21, 22, 23, 24, 25, 26 and 28, which are engine control sensors, i.e. sensors also used to control the operation of the turbomachine. The sensors 21, 22, 23, 24, 25, 26 are external to the cooling air circuit 13 of the casing 121.

The flow rate $W_{HPTACC}$ of cooling air of the cooling air circuit 13 of the casing 121 of the high-pressure turbine 9 is computed in a computing unit 30 as a function of at least one, several or all of the total pressure PT2 at the fan inlet, the static pressure Ps3 at the outlet of the high-pressure compressor 6, the temperature T25 between compressors, the outlet temperature T3 of the high-pressure compressor 6, the rotational speed XN12 of the low-pressure shaft, the rotational speed XN25 of the high-pressure shaft, and the degree of opening TO14 of the valve of the cooling air circuit 13.

The inventor has specifically determined empirically that the variations of these parameters affect the flow rate $W_{HPTACC}$ of cooling air.

Thus, the inventor has determined that the flow rate $W_{HPTACC}$ of cooling air varies as a function of the first difference between the outlet temperature T3 of the high-pressure compressor 6 and the temperature T25 between compressors, particularly as a function of the square root of this first difference (T3−T25), and more precisely proportionately to the inverse of the square root of this first difference (T3−T25). Thus, according to embodiments, the flow rate $W_{HPTACC}$ of cooling air is computed by the computing unit 30 as a function of this first difference (T3−T25), or as a function of the square root of this first difference (T3−T25), or as a function of the inverse of the square root of this first difference (T3−T25).

The inventor has also determined that the flow rate $W_{HPTACC}$ of cooling air varies proportionately to the second difference between the static pressure Ps3 at the outlet of the high-pressure compressor 6 and the total pressure PT2 at the fan inlet. Thus, according to an embodiment, the flow rate $W_{HPTACC}$ of cooling air is computed by the computing unit 30 proportionately to this second difference (Ps3−PT2).

The inventor has also determined that the flow rate $W_{HPTACC}$ of cooling air varies proportionately to the ratio of the total pressure PT2 at the fan inlet to the static pressure Ps3 at the outlet of the high-pressure compressor 6. Thus, according to an embodiment, the flow rate $W_{HPTACC}$ of cooling air is computed by the computing unit 30 proportionately to this ratio PT2/Ps3.

The inventor has furthermore determined that the flow rate $W_{HPTACC}$ of cooling air varies proportionately to a reduced flow rate $W_{red}$ and that this reduced flow rate $W_{red}$ can be modeled by a single model varying as a function of the second ratio of the rotational speed XN25 of the high-pressure shaft to the rotational speed XN12 of the low-pressure shaft and as a function of the degree of opening TO14 of the valve of the cooling air circuit 13. The flow rate $W_{HPTACC}$ of cooling air is for example expressed in kg/s. The reduced flow rate $W_{red}$ is for example expressed in kg/s.

Thus, according to an embodiment, values V1 of reduced flow rate $W_{red}$ are previously stored in a database 32 in association with values V2 of the second ratio XN25/XN12 and in association with values V3 of the degree TO14 of valve opening of the cooling air circuit 13. These values V1, V2, V3 can be previously stored in the database 32 in the form for example of a set of points for a multiplicity of values V2 of the second ratio XN25/XN12, which are located for example within a determined range and which are associated with a multiplicity of values V1 of reduced flow rate $W_{red}$, and this for a plurality of values V3 of degree TO14 of valve opening of the cooling air circuit 13.

According to an embodiment, the reduced flow rate $W_{red}$ is computed from values V1, V2, V3 of the database 32 and as a function of the computed ratio of the rotational speed XN25 of the high-pressure shaft, which has been measured, to the rotational speed XN12 of the low-pressure shaft, which has been measured (this ratio being then known as the second measured ratio RM for XN25/XN12) and as a function of the degree TO14 of valve opening of the cooling air circuit 13, which has been measured. This computation can be carried out by selecting from the database 32 the values V2 that are nearest to the second measured ratio RM for XN25/XN12 for the values V3 that are the nearest to the degree TO14 of valve opening of the cooling air circuit 13, which has been measured, then by making an interpolation or an extrapolation of the values V1 associated with these selected values V2 and V3. In a variant, the values V1 can be defined in the database 32 by a function linking the values V1 to the values V2 for a plurality of values V3. For each value V3 of the degree TO14 of valve opening of the cooling air circuit 13, the values V1 of reduced flow rate $W_{red}$ can for example be decreasing as a function of the increasing values V2 of the second ratio XN25/XN12. For each value V2 of the second ratio XN25/XN12, the values V1 of reduced flow rate $W_{red}$ can for example be increasing as a function of the increasing values V3 of the degree TO14 of valve opening of the cooling air circuit 13.

According to an embodiment, the flow rate $W_{HPTACC}$ of cooling air of the cooling air circuit 13 of the casing 121 of the high-pressure turbine 9 is computed in the computing unit 30 as a function of at once the total pressure PT2 at the fan inlet, the static pressure Ps3 at the outlet of the high-pressure compressor 6, the temperature T25 between compressors, the outlet temperature T3 of the high-pressure compressor 6, the rotational speed XN12 of the low-pressure shaft, the rotational speed XN25 of the high-pressure shaft and the degree TO14 of valve opening of the cooling air circuit 13.

According to an embodiment, the flow rate $W_{HPTACC}$ of cooling air is computed in the computing unit 30 according to the following equation:

$$W_{HPTACC} = W_{red}\left(\frac{XN25}{XN12}\right) * \frac{PT2}{Ps3} * (Ps3 - PT2) * \frac{1}{\sqrt{T3 - T25}}$$

where $$W_{red}\left(\frac{XN25}{XN12}\right)$$

denotes the reduced flow rate $W_{red}$ as a function of the second ratio XN25/XN12, and * denotes multiplication.

This equation is for example provided for each of the plurality of values V3 of degree TO14 of valve opening of the cooling air circuit 13. The computing unit 30 for example comprises a module 33 for computing the flow rate $W_{HPTACC}$ of cooling air based on, on the one hand, the reduced flow rate $W_{red}$ which has been computed based on the database 32 and, on the other hand, the total pressure PT2 at the fan inlet, the static pressure Ps3 at the outlet of the high-pressure compressor 6, the temperature T25 between compressors and the outlet temperature T3 of the high-pressure compressor 6.

According to an embodiment of the invention, the computing unit 30 is automatic and can be or comprise, for example, one or more calculator(s) and/or one or more computer(s), and/or one or more processor(s) and/or one or more server(s) and/or one or more machine(s), which can be programmed in advance by a previously stored computer program. The computing unit 30 is airborne with the turbomachine into the aircraft or other.

According to an embodiment of the invention, on the computing unit 30 or calculator 30 is stored a computer program, comprising code instructions for implementing the method for measuring the flow rate $W_{HPTACC}$ of cooling air. The computing unit 30 or calculator 30 is able to execute the computer program.

According to an embodiment of the invention, the computing unit 30 comprises an output 31 to which is supplied the flow rate $W_{HPTACC}$ of cooling air of the cooling air circuit 13 of the casing 121 of the high-pressure turbine 9, which has been computed by this computing unit 30. The flow rate $W_{HPTACC}$ of cooling air, which has been computed by the computing unit 30, can be for example stored in the database 32 or in another memory, for example in association with the measurements provided by one or several or all of the sensors 21, 22, 23, 24, 25, 26, 28, and/or is for example displayed and/or communicated on a human-machine interface connected to the computing unit 30 and/or transmitted to the outside on at least one output port.

The invention makes it possible to dispense with an additional dedicated flow rate sensor in the cooling air circuit 13 of the casing 121 of the high-pressure turbine 9 of the turbomachine 1, and therefore to save costs and gain reliability (a smaller number of sensors entailing a lower risk of failures), while improving the accuracy of the supplied flow rate measurement by comparison with known solutions using such a dedicated flow rate sensor in the circuit 13. In addition, the invention makes it possible to further limit the uncertainty on the supplied flow rate measurement, and to save memory space in the computing unit 30 and the database 32. The value thus obtained of the flow rate $W_{HPTACC}$ of cooling air of the circuit 13 according to the invention makes it possible to better control the cooling carried out by this cooling air circuit 13 on the casing 121 of the high-pressure turbine 9 and to better control the clearance between the blades 92 of the high-pressure turbine 9 and the high-pressure turbine casing 121.

Of course, the embodiments, features and examples above can be combined with one another or be selected independently of one another.

The invention claimed is:

1. A method for measuring a flow rate of cooling air in a cooling air circuit of a casing of a high-pressure turbine of a turbomachine,
   comprising measuring at least
      by a first sensor of pressure, disposed at a fan inlet of a fan of the turbomachine, of a total pressure at the fan inlet,
      by a second sensor of pressure, disposed at an outlet of a high-pressure compressor of the turbomachine, of a static pressure at the outlet of the high-pressure compressor,
      by a fifth sensor of a rotational speed of a low-pressure shaft,
      by a sixth sensor of a rotational speed of a high-pressure shaft,
      by a seventh sensor of a degree of opening of at least one valve of the cooling air circuit,
   computing by a computing unit the flow rate of cooling air as a function of at least the total pressure at the fan inlet, of the static pressure at the outlet of the high-pressure compressor, of the rotational speed of the low-pressure shaft, of the rotational speed of the high-pressure shaft and of the degree of opening of the at least one valve of the cooling air circuit.

2. The method as claimed in claim 1, comprising measuring by a third sensor of temperature, disposed between a low-pressure compressor of the turbomachine and the high-pressure compressor, of a temperature between compressors,
   computing by a computing unit the flow rate of cooling air as a function of at least the total pressure at the fan inlet, of the static pressure at the outlet of the high-pressure compressor, of the temperature between compressors, of the rotational speed of the low-pressure shaft, of the rotational speed of the high-pressure shaft and of the degree of opening of the at least one valve of the cooling air circuit.

3. The method as claimed in claim 1, comprising measuring by a fourth sensor of temperature, disposed at the outlet of the high-pressure compressor, of an outlet temperature of the high-pressure compressor,
   computing by the computing unit the flow rate of cooling air as a function of at least the total pressure at the fan inlet, of the static pressure at the outlet of the high-pressure compressor, of the outlet temperature of the high-pressure compressor, of the rotational speed of the low-pressure shaft, of the rotational speed of the high-pressure shaft and of the degree of opening of the at least one valve of the cooling air circuit.

4. The method of claim 1, wherein the first, second, fifth and sixth sensors are engine control sensors.

5. The method of claim 1, wherein the first, second, fifth and sixth sensors are external to the cooling air circuit of the casing of the high-pressure turbine of the turbomachine.

6. The method of claim 1, comprising previously storing values of reduced flow rate in a database in association with values of a ratio of the rotational speed of the high-pressure shaft to the rotational speed of the low-pressure shaft and in association with values of the degree of opening of the at least one valve of the cooling air circuit, computing a reduced flow rate, based on values of the database and as a function of the ratio of the rotational speed of the high-pressure shaft, which has been measured, to the rotational speed of the low-pressure shaft, which has been measured, and as a function of the degree of opening of the at least one valve of the cooling air circuit, which has been measured, the flow rate of cooling air being computed proportionately to the reduced flow rate, which has been computed.

7. The method as claimed in claim 1, comprising measuring by a third sensor of temperature, disposed between a low-pressure compressor of the turbomachine and the high-pressure compressor, of a temperature between compressors, measuring by a fourth sensor of temperature, disposed at the outlet of the high-pressure compressor, of an outlet temperature of the high-pressure compressor, computing the flow rate of cooling air as a function of a difference between the outlet temperature of the high-pressure compressor and the temperature between compressors.

8. The method as claimed in claim 7, comprising computing the flow rate of cooling air as a function of a square root of the difference between the outlet temperature of the high-pressure compressor and the temperature between compressors.

9. The method as claimed in claim 7, comprising computing that the flow rate of cooling air proportionately to the inverse of the square root of the difference between the outlet temperature of the high-pressure compressor and the temperature between compressors.

10. The method as claimed in claim 1, comprising computing the flow rate of cooling air proportionately to a difference between the static pressure at the outlet of the high-pressure compressor and the total pressure at the fan inlet.

11. The method as claimed in claim 1, comprising computing the flow rate of cooling air proportionately to a ratio of the total pressure at the fan inlet to the static pressure at the outlet of the high-pressure compressor.

12. The method as claimed in claim 6, comprising measuring by a third sensor of temperature, disposed between a low-pressure compressor of the turbomachine and the high-pressure compressor, of a temperature between compressors, measuring by a fourth sensor of temperature, disposed at the outlet of the high-pressure compressor, of an outlet temperature of the high-pressure compressor, computing the flow rate $W_{HPTACC}$ of cooling air according to the following equation:

$$W_{HPTACC} = W_{red}\left(\frac{XN25}{XN12}\right) * \frac{PT2}{Ps3} * (Ps3 - PT2) * \frac{1}{\sqrt{T3 - T25}}$$

where
$W_{red}$ is the reduced flow rate,
PT2 is the total pressure at the fan inlet,
Ps3 is the static pressure at the outlet of the high-pressure compressor,
T25 is the temperature between compressors,
T3 is the outlet temperature of the high-pressure compressor, XN12 is the rotational speed of the low-pressure shaft,
XN25 is the rotational speed of the high-pressure shaft.

13. A measuring device, intended to measure a flow rate of cooling air in a cooling air circuit of a casing of a high-pressure turbine of a turbomachine, the measuring device comprising at least
a first sensor of pressure, intended to be disposed at a fan inlet of a fan of the turbomachine, for measuring a total pressure at the fan inlet,
a second sensor of pressure, intended to be disposed at an outlet of a high-pressure compressor of the turbomachine, for measuring a static pressure at the outlet of the high-pressure compressor,
a fifth sensor of rotational speed of a low-pressure shaft,
a sixth sensor of rotational speed of a high-pressure shaft,
a seventh sensor of the degree of opening of at least one valve of the cooling air circuit,
a unit for computing the flow rate of cooling air in the cooling air circuit of the casing of the high-pressure turbine as a function of at least the total pressure at the fan inlet, of the static pressure at the outlet of the high-pressure compressor, of the rotational speed of the low-pressure shaft, of the rotational speed of the high-pressure shaft, and of the degree of opening of the at least one valve of the cooling air circuit.

14. The device as claimed in claim 13, comprising a third sensor of temperature, intended to be disposed between a low-pressure compressor of the turbomachine and the high-pressure compressor, for measuring a temperature between compressors, the computing unit being provided for computing the flow rate of cooling air in the cooling air circuit of the casing of the high-pressure turbine as a function of at least the total pressure at the fan inlet, of the static pressure at the outlet of the high-pressure compressor, of the temperature between compressors, of the rotational speed of the low-pressure shaft, of the rotational speed of the high-pressure shaft and of the degree of opening of the at least one valve of the cooling air circuit.

15. The device as claimed in claim 13, comprising a fourth sensor of temperature, intended to be disposed at the outlet of the high-pressure compressor, for measuring an outlet temperature of the high-pressure compressor, the computing unit being provided for computing the flow rate of cooling air in the cooling air circuit of the casing of the high-pressure turbine as a function of at least the total pressure at the fan inlet, of the static pressure at the outlet of the high-pressure compressor, of the outlet temperature of the high-pressure compressor, of the rotational speed of the low-pressure shaft, of the rotational speed of the high-pressure shaft and of the degree of opening of the at least one valve of the cooling air circuit.

16. A computer program, comprising code instructions for implementing the method for measuring the flow rate of cooling air in a cooling air circuit of a casing of a high-pressure turbine of a turbomachine as claimed in claim 1, when it is executed on a calculator.

* * * * *